(12) United States Patent
Wang et al.

(10) Patent No.: US 11,329,893 B2
(45) Date of Patent: May 10, 2022

(54) LIVE NETWORK REAL TIME INTELLIGENT ANALYSIS ON DISTRIBUTED SYSTEM

(71) Applicant: Verizon Patent and Licensing Inc., Arlington, VA (US)

(72) Inventors: Ying Wang, Herndon, VA (US); Rick L. Halstead, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 16/360,850

(22) Filed: Mar. 21, 2019

(65) Prior Publication Data

US 2020/0304381 A1 Sep. 24, 2020

(51) Int. Cl.
*H04L 12/24* (2006.01)
*H04L 41/5009* (2022.01)
*H04L 41/14* (2022.01)
*H04L 43/04* (2022.01)
*H04W 24/08* (2009.01)
*H04L 47/2475* (2022.01)
*H04L 41/16* (2022.01)
*H04L 47/2416* (2022.01)

(52) U.S. Cl.
CPC ........ *H04L 41/5009* (2013.01); *H04L 41/145* (2013.01); *H04L 41/16* (2013.01); *H04L 43/04* (2013.01); *H04L 47/2416* (2013.01); *H04L 47/2475* (2013.01); *H04W 24/08* (2013.01)

(58) Field of Classification Search
CPC . H04L 41/5009; H04L 47/2416; H04L 43/04; H04L 47/2475; H04L 41/16
USPC ......................................................... 709/224
See application file for complete search history.

(56) References Cited

U.S. PATENT DOCUMENTS

| | | | |
|---|---|---|---|
| 2005/0182582 A1* | 8/2005 | Chen .................... | G06F 11/3433 702/108 |
| 2010/0223212 A1* | 9/2010 | Manolescu .............. | G09B 7/00 706/12 |
| 2012/0278886 A1* | 11/2012 | Luna ....................... | H04W 4/50 726/22 |
| 2016/0241520 A1* | 8/2016 | Seul ........................ | H04L 9/002 |
| 2017/0111233 A1* | 4/2017 | Kokkula .............. | H04L 41/0823 |

* cited by examiner

*Primary Examiner* — Emmanuel L Moise
*Assistant Examiner* — Zia Khurshid (57) ABSTRACT

A method, a device, and a non-transitory storage medium provide a network evaluation service. The service collects live network traffic data for a client device in a network; stores a benchmark pattern model; determines a category of the live network traffic data based on a segment size; detects a first traffic pattern of the live network traffic data based on measured segment parameters for the category; matches the first traffic pattern to a second traffic pattern in the benchmark pattern model to identify a result; compares the live network traffic data with a benchmark application pattern from the benchmark pattern model; and identifies, based on the comparing, a level of degraded performance in the network.

20 Claims, 10 Drawing Sheets

LIVE NETWORK REAL TIME INTELLIGENT ANALYSIS ON DISTRIBUTED SYSTEM

BACKGROUND

Accurate real-time depiction of network conditions and trends is important for optimization of network services and application use. Implementations of new broadband cellular networks (e.g., 3GPP 5G networks) and other wireless networks (e.g., IEEE 802.11ax) are raising user expectations for increased network speeds. Challenges to properly allocate and optimize resources apply not only to cellular network carriers and internet service providers, but also to mobile device manufactures and applications designers.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

For network testing, automation plays a significant role that is becoming increasingly important as machine learning and artificial intelligence continue to improve. As automated network testing capabilities improve, requirements for flexibility and accuracy in such testing have increased accordingly. Automated testing may be divided into two parts: test execution automation and result analysis automation. Systems and methods described herein may serve as an interface to various test execution automation tools and also serve as a light weight adaptive intelligent analysis system. The systems and methods may provide a cross platform system that can be used in different network conditions.

Implementations described herein employ a cross-platform network evaluation service that collects live network traffic and intelligently analyzes traffic conditions among multiple devices simultaneously. The network evaluation service can apply to wired and wireless communications/protocols, including, but not limited to, cellular networks, wireless local area networks (e.g., Wi-Fi), personal area networks (e.g., Bluetooth), and machine-to-machine communications.

Different conditions of a network can impact data speed of packets with different sizes. Data speeds over uplink and downlink connections may be impacted differently. In addition to data speed, network conditions can also impact jitter and latency. Thus, data speed, jitter, and latency can be considered three basic features of each packet size traversing a network. Besides grouping by packet size, the network evaluation service may also be used for evaluating protocol fields, such as grouping by frame size, etc. For a given client device, and a given application, certain patterns of the packet size and/or frame size (e.g., patterns for data speed, jitter, and latency, referred to herein generally as "parameters") may exist over uplink and downlink directions.

The network evaluation service described herein may provide a solution to "learn" about parameters of essentially every packet size of each application on each device in the network. The network evaluation service may also provide a solution to learn about the trends for applications/devices in the network. In one instance, the learning result can be used to predict the application performance on each device in different network conditions. In another instance, the learning result can also be used to spot negative behavior in the network. For example, if some client device/application is consuming more airtime than defined in a network protocol, the network evaluation service can identify the client device/application. As more and more devices are used in home or business networks, this ability to detect the negative behavior can be an important tool for optimizing network performance.

According to one embodiment, the network evaluation service can be intelligently distributed to multiple computers or network devices based on the load of the network. The network evaluation service may filter raw data on a real-time basis, even in a heavily-loaded network, and may only save statistical information, so as to preclude the need for massive data storage. The network evaluation service may intelligently vary the time resolution for data collection and evaluation based on the network load, and may provide a seamless analysis of the live network.

Figure 1:
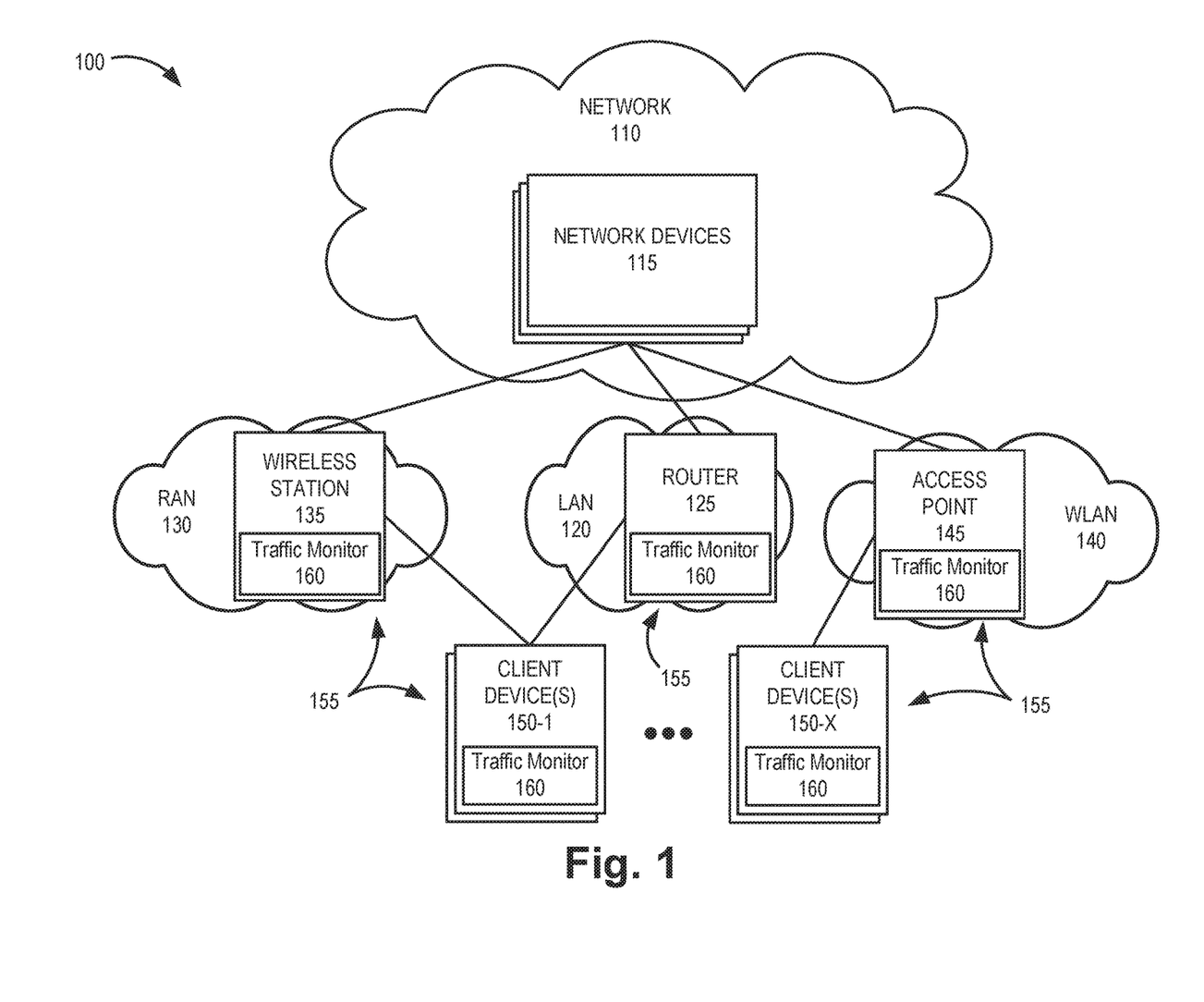
FIG. 1 is a diagram illustrating an exemplary environment in which exemplary embodiments of a network evaluation service may be implemented.

FIG. 1 is a diagram illustrating an exemplary environment 100 in which exemplary embodiments of a network evaluation service may be implemented. As illustrated, environment 100 includes a network 110 with network devices 115, a local area network (LAN) 120 with a router 125, a radio access network (RAN) 130 with a wireless station 135, a wireless LAN (WLAN) 140 with an access point 145, and client devices 150. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Network 110 includes one or multiple networks of one or multiple types that provide access to a network evaluation service, as described herein. Network 110 may be implemented to include a wired network and/or a wireless network. Network 110 may be implemented as a private network or a public network. According to an exemplary implementation, network 110 may be an Internet Protocol (IP)-based network. In one implementation, network 110 may support cloud-based services provided from one or more network devices 115.

Network device 115 may include a network device that provides centralized functions for the network evaluation service, as described herein. For example, network device 115 may manage workload distribution for the network evaluation service among multiple devices (e.g., devices 155). According to an implementation, network device 115 may include a network server device. Additionally, network device 115 may include other devices and or functions described herein to facilitate the distributed network evaluation service. For example, according to an exemplary embodiment, network device 115 may include databases or libraries pertaining to benchmarks for various patterns of packet transmissions associated with different application/device combinations.

Router 125 may include one or more network devices that process and/or forward traffic. Router 125 may, for example, provide connectivity of client devices 150 to network 110 by serving as a traffic exit/entry point for client devices 150. According to different implementations, router 125 may include a home or residential routers and may include any devices capable of performing the functions of router 125 as described herein.

Wireless station 135 may include a network device that has computational and wireless communication capabilities. Wireless station 135 may include a transceiver system that connects a client device 150 to other components of RAN 130 and network 110 using wireless/wired interfaces. Wireless station 135 may be implemented as a base station (BS), a base transceiver station (BTS), a Node B, an evolved Node B (eNB), an evolved LTE (eLTE) eNB, a next generation Node B (gNB), a remote radio head (RRH), an RRH and a baseband unit (BBU), a BBU, or other type of wireless node (e.g., a picocell node, a femtocell node, a microcell node, etc.) that provides wireless access to RAN 130. Wireless station 135 may support a RAN 130 having one or more radio access technology (RAT)-types. For example, in one implementation, RAN 130 may include an Evolved UMTS Terrestrial Radio Access Network (E-UTRAN) of a Long Term Evolution (LTE) network, while in another implementation, RAN 130 may include a 5G RAN.

Access point 145 may include a device with a transceiver configured to communicate with client device 150 using Wi-Fi signals based on the Institute of Electrical and Electronics Engineers (IEEE) 802.11 standards for implementing a wireless LAN. Access point 145 may enable client device 150 to communicate with other devices in WLAN 140 and with other devices in network 110 or other networks.

Client device 150 may include an end user device, a server device, or another type of computing device. In other implementations, client device 150 may be implemented as a machine-type communications (MTC) device, an Internet of Things (IoT) device, a machine-to-machine (M2M) device, etc. Client device 150 may be a mobile device. For example, client device 150 may be implemented as a smartphone, a tablet device, a netbook, a computer (e.g., a laptop, a palmtop, etc.), or another type of mobile device. Alternatively, client device 150 may be a non-mobile (e.g., stationary) device. For example, client device 150 may be implemented as a terminal or desktop computer. Client devices 150 may store applications (or "apps") that receive and/or generate traffic (e.g., packets) over one or more of LAN 120, RAN 130, or WLAN 140. As described further herein, applications running on client device 150 may have traffic characteristics, such as data speed, latency, and jitter for each packet size and direction, that can be identified and characterized by the network evaluation service.

Router 125, wireless station 135, access point 145, and client devices 150 may be referred to herein collectively as "devices 155' and generically as a "device 155." According to implementations described herein, each device 155 may include a traffic monitor 160 for use with the network evaluation service. Each traffic monitor 160 may be selectively engaged by a centralized distribution engine in network 110 (e.g., one or more of network devices 115) to collect, monitor, and/or analyze network traffic over a respective LAN 120, RAN 130, or WLAN 140. Traffic monitor 160 is described further in connection with FIGS. 3, for example.

A distributed system of traffic monitors 160 used for the network evaluation service may provide real-time intelligence on devices 155 using a network. Such real-time intelligence can provide multiple benefits for optimizing network usage, such as configuring networks, directing traffic, selecting/configuring client devices 150, etc. Information collected from traffic monitors 160 may also prove valuable for service providers to determine if an upgraded or downgraded network service packages may be beneficial for a particular customer. Similarly, customers could also determine if device (e.g., client device 150) upgrades or downgrades might be appropriate for certain types of applications being used. Furthermore, device vendors may also use data from the network evaluation service to determine how well their products work with certain networks and applications.

Figure 2:
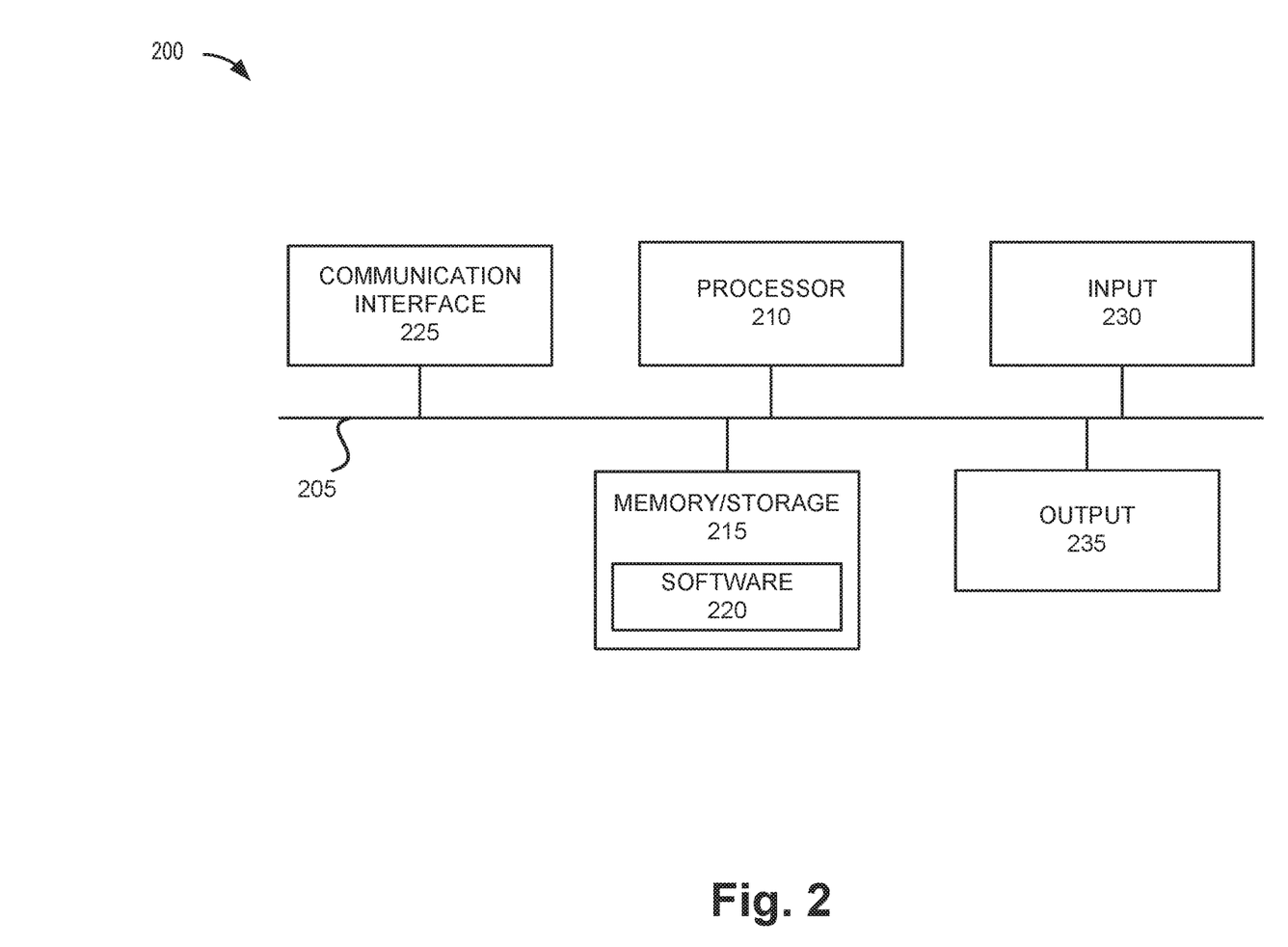
FIG. 2 is a diagram illustrating exemplary components of a device that may correspond to one or more of the devices illustrated in FIG. 1

FIG. 2 is a diagram illustrating exemplary components of a device 200 that may correspond to one or more of the devices described herein. For example, device 200 may correspond to components included in network device 115, router 125, wireless station 135, access point 145, and client device 150. As illustrated in FIG. 2, according to an exemplary embodiment, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium. Memory/storage 215 may store data, software, and/or instructions related to the operation of device 200.

Software 220 includes an application or a program that provides a function and/or a process. Software 220 may include an operating system. Software 220 may also include firmware, middleware, microcode, hardware description language (HDL), and/or other forms of instructions. Additionally, for example, device 200 may include logic to perform tasks, as described herein, based on software 220 (e.g., traffic monitor 160).

Communication interface 225 permits device 200 to communicate with other devices, networks, systems, devices, and/or the like. Communication interface 225 includes one or multiple wireless interfaces and/or wired interfaces. For example, communication interface 225 may include one or multiple radio frequency (RF) transmitters and receivers, or transceivers. Communication interface 225 may include one or more antennas. For example, communication interface 225 may include an array of antennas. Communication interface 225 may operate according to a protocol stack and a communication standard. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
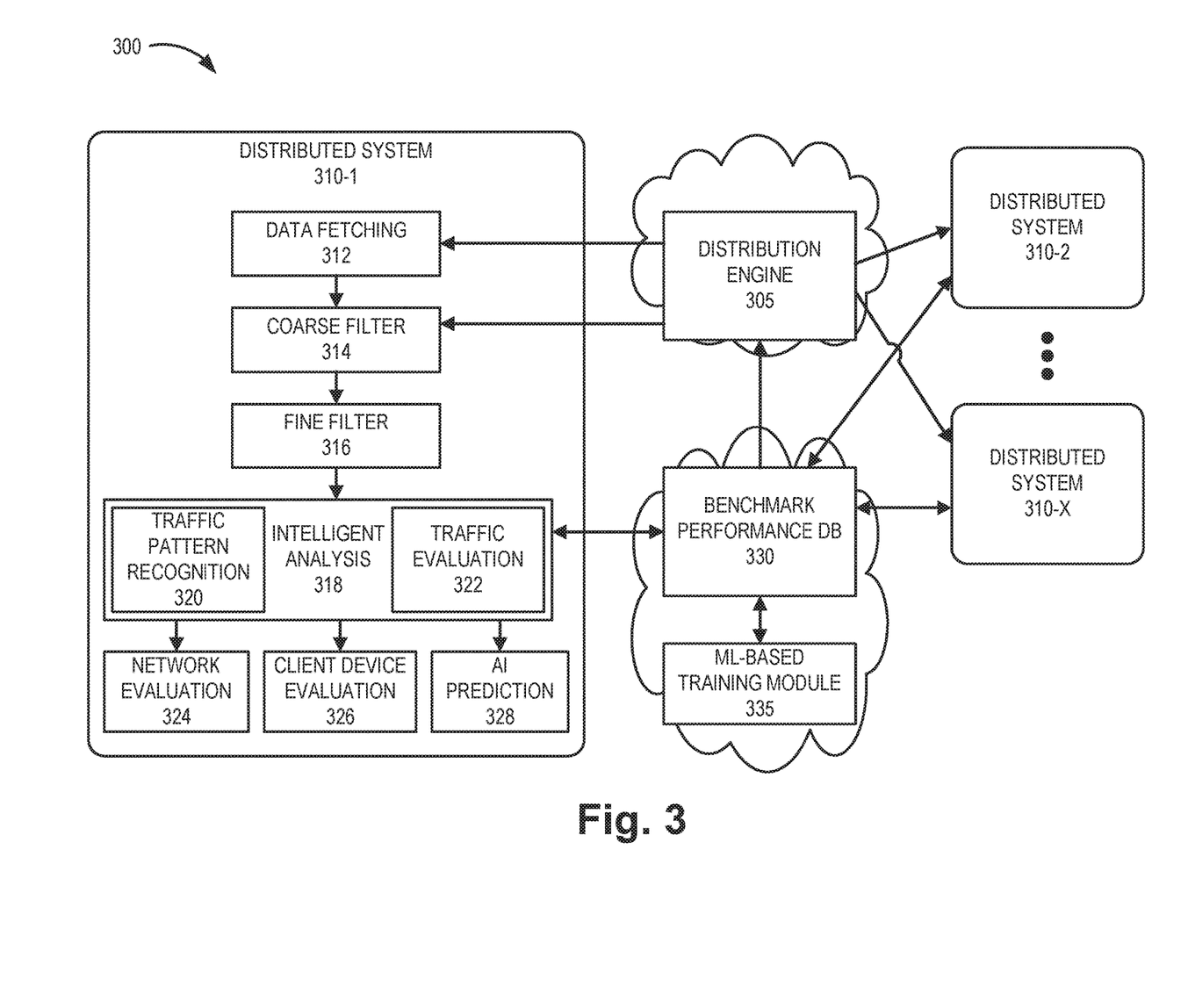
FIG. 3 is a diagram illustrating an exemplary architecture of the network evaluation service in a portion of the network environment of FIG. 1.

FIG. 3 is a diagram illustrating an exemplary architecture of the network evaluation service in a portion 300 of network environment 100. As shown in FIG. 3, network portion 300 may include a distribution engine 305, distributed systems 310-1 through 310-X, a benchmark performance database (DB) 330, and a training module 335.

Distribution engine 305, benchmark performance database 330, and training module 335 may be cloud-based components that coordinate different distributed systems 310. For example, each of distribution engine 305, benchmark performance database 330, and training module 335 may be incorporated into one or more network devices 115 in network 110. Each distributed system 310 may be included in a device 155 executing, for example, traffic monitor 160.

Distribution engine 305 may intelligently distribute workloads for the network evaluation service to single or multiple devices 155 based on the load of a network. Based on the distribution, distribution engine 305 may send monitoring settings to each active distributed system 310.

Distributed system 310 may include a data fetching function 312, a coarse filter 314, a fine filter 316, and an intelligent analysis function 318. Data fetching function 312 may continuously collect live network data based on monitoring settings received from distribution engine 305. The live network data may include, for example, packet size, data speed, latency, jitter, and data from packet headers. Data fetching function 312 may send one segment of data to coarse filter 314 at time. The data processing time by coarse filter 314 for each segment may be less than the collection time by data fetching function 312 for each segment. According to one implementation, the collection time of each segment may vary based on the data speed of the monitoring network. According to an implementation, each distributed system 310 may employ a flexible pcap (packet capture) size to adjust between processing time and data collection time.

Coarse filter 314 may filter out unnecessary raw data, such as data unrelated to data speeds, throughput, frame size, packet size, latency, jitter, etc. Coarse filter 314 may pass the remaining (e.g., necessary) data to fine filter 316. Fine filter 316 may divide the remaining data into different categories for further analysis. For example, categories may include categories based on a data segment size (e.g., a packet size range, a frame size range, etc.). According to one implementation, both coarse filter 314 and fine filter 316 may be data frame based, such as employing PYTHON data frame filtering, which provides flexible and fast filtering. Filtered data from fine filter 316 may include, without limitation, data speed, latency, and jitter for each packet size and direction. Fine filter 316 may forward the filtered data to intelligent analysis function 318

Intelligent analysis function 318 may include a traffic pattern recognition function 320 and a traffic evaluation function 322. Intelligent analysis function 318 may receive filtered data from fine filter 316. Traffic pattern recognition function 320 may apply pattern recognition to identify a pattern (e.g. a particular combination of data speed, latency, and jitter for each direction) in the filtered data that may be attributed, for example, to a particular application. In one implementation, traffic pattern recognition function 320 may retrieve a benchmark pattern model, from benchmark performance database 330, for comparison to a recognized pattern. Traffic evaluation function 322 may compare the relevant benchmark to the actual data to determine how much the application traffic has been impacted by the network. Traffic evaluation function 322 may also provide the determined data pattern to benchmark performance database 330 for storage. As data continues to be collected, the pattern matching available through benchmark performance database 330 will become more accurate. Intelligent analysis function 318 is described further in connection with FIGS. 4A-4C below.

Results from intelligent analysis function 318 may provide multiple uses. For example, a network evaluation function 324 may use results from intelligent analysis function 318 for optimizing network usage, such as configuring networks, directing traffic, and reserving resources. Information from intelligent analysis function 318 may also prove valuable for service providers to determine if upgraded or downgraded network service packages may be beneficial for a particular customer. For example, network evaluation function 324 may determine whether allocated network resources for a network are sufficient for a particular combination of application and client device 150.

A client device evaluation function 326 may provide guidance to select/configure client devices 150, etc. Similarly, customers could also determine if device upgrades or downgrades (e.g., for client device 150) might be appropriate for certain types of applications being used. Furthermore, device vendors may also use data from the network evaluation function 324 and/or client device evaluation function 326 to determine how well their products work with certain networks and applications.

Artificial intelligence (AI) prediction function 328 may use output from intelligent analysis function 318 as well as historical data from benchmark performance database 330 to predict the performance of a local network with currently-connected devices 150 when a capacity of the network changes.

Although FIG. 3 shows exemplary components of network portion 300, in other implementations, network portion 300 may include fewer components, different components, differently-arranged components, or additional components than depicted in FIG. 3. For example, one or more of network evaluation function 324, client device evaluation function 326, or AI prediction function 328 may be part of a separate system, such as a cloud-based system. Additionally or alternatively, one or more components of network portion 300 may perform functions described as being performed by one or more other components of network portion 300.

Figure 4A:
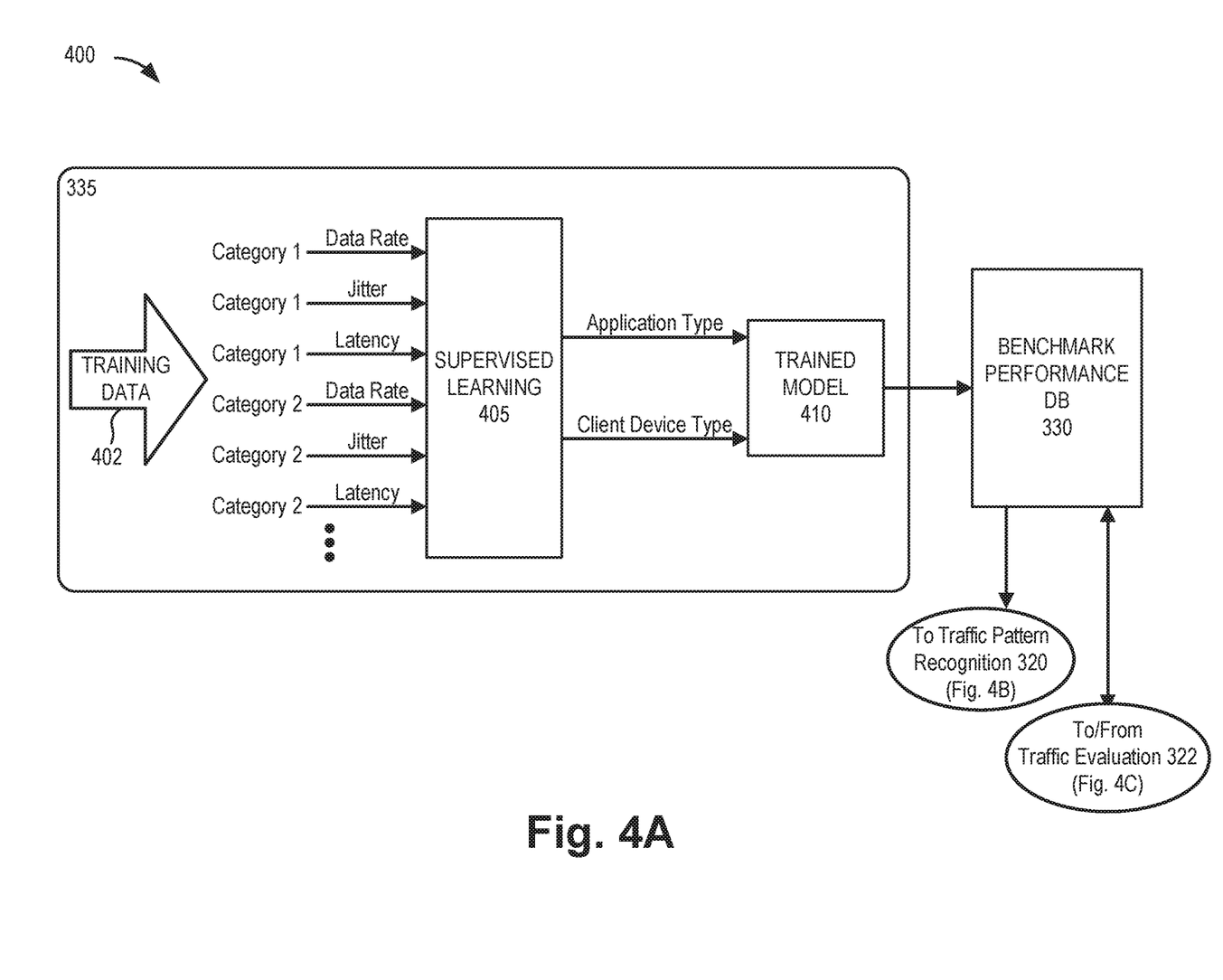
FIGS. 4A-4C are diagrams illustrating exemplary intelligent analysis provided by the network evaluation service in FIG. 3.
Figure 4B:
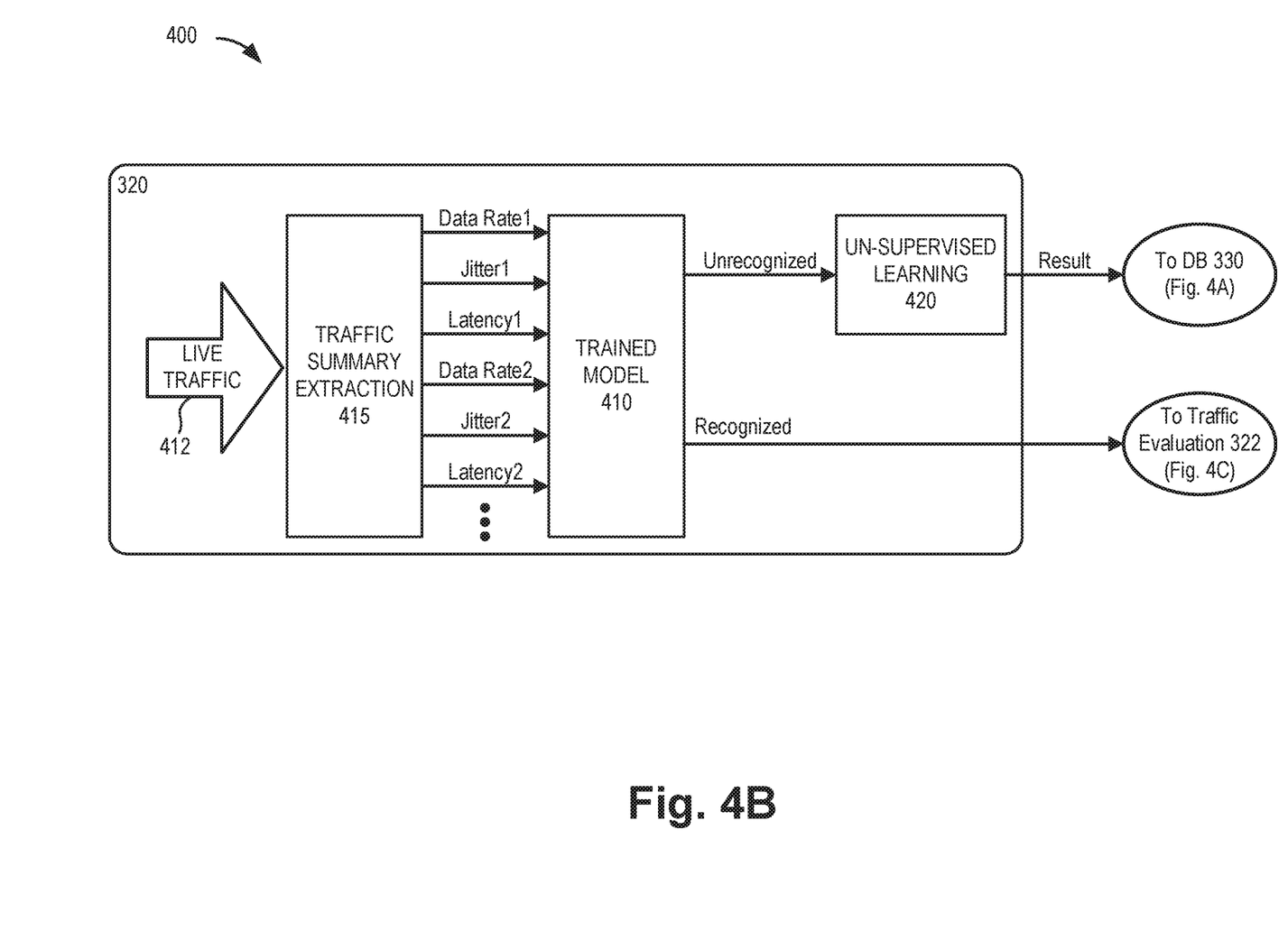
Figure 4C:
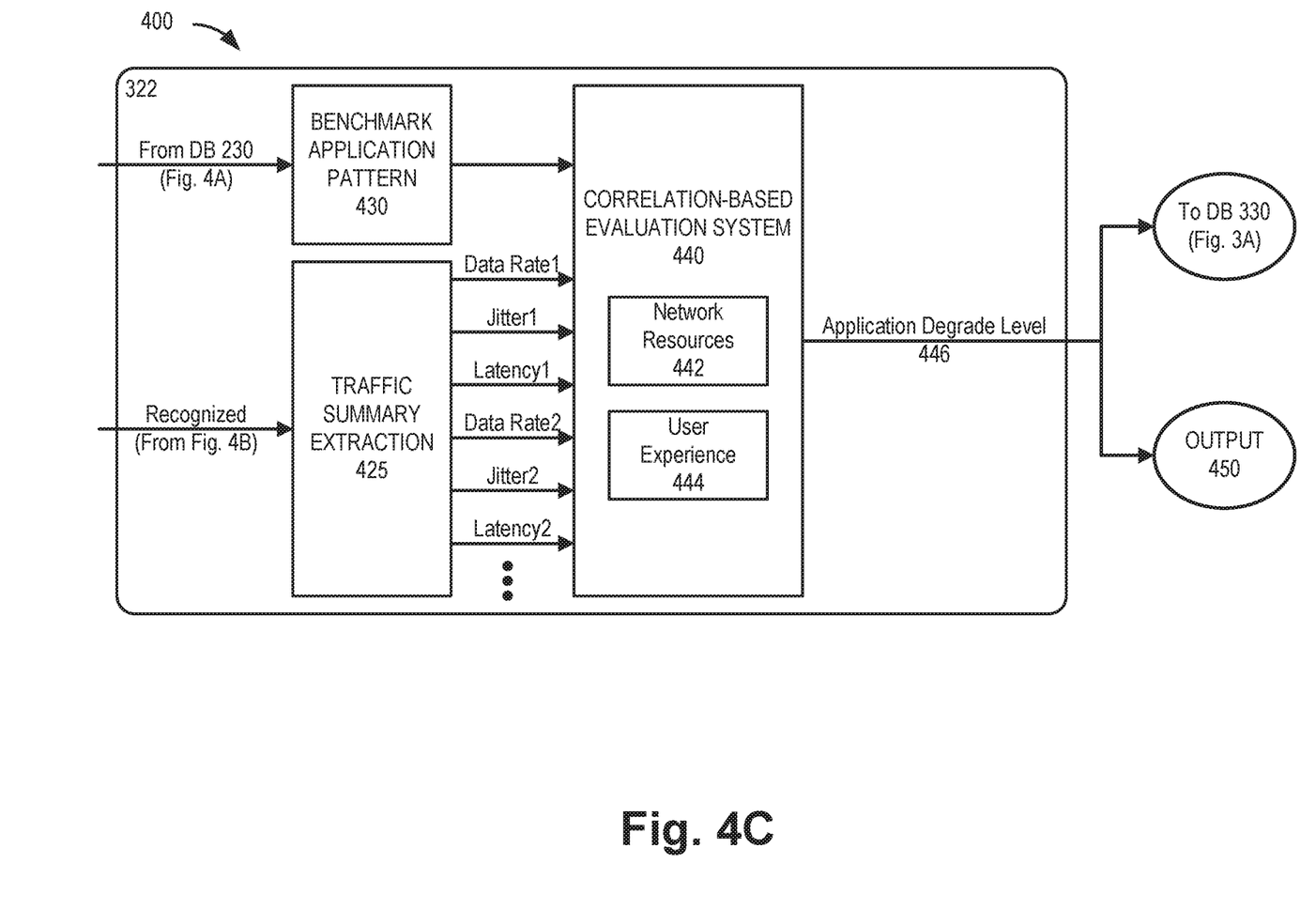

FIGS. 4A-4C are diagrams illustrating exemplary intelligent analysis for the network evaluation service in a portion 400 of network environment 100. As shown in FIGS. 4A-4C, network portion 400 may include traffic pattern recognition function 320 and traffic evaluation function 322 of intelligent analysis function 318, along with benchmark performance database 330 and training module 335.

Privacy regulations/restrictions may prevent packet inspections that directly identify the application type of each data packet. Thus, according to one implementation, the network evaluation service may use pattern recognition to predict the type of the application associated with a packet and compare the packet data with the benchmark network performance for that type of application. Based on the comparison, the network evaluation function 324 can evaluate the application performance in a particular network (e.g., LAN 120, RAN 130, WLAN 140, etc.). If the performance is compromised, a service provider or network administrator may adjust network configurations accordingly. Such adjustments may also provide an intelligent network resource allocation.

In an exemplary implementation, one way of categorizing packet size is based on the following bit ranges: [0,88], [88,128], [128,256], [256,512], [512,1024], [1024,1280], [1280,1518], [1518, ~]. Based on the size of each packet, a packet will fall into one of these ranges. In other implementations, ranges may be applied to other protocol field groupings besides packet size, such as, for example, group by frame size, etc. In still other implementations, different ranges may be used. Packet size is used here as an example for illustrative purposes.

For each data segment obtained by intelligent analysis function 318 (e.g., from fine filter 316), multiple packets may be included. The data rate, latency, and jitter (e.g., parameters) of packets in each category (e.g., a size range) are calculated in intelligent analysis function 318. These parameters may be input to traffic pattern recognition function 320 and traffic evaluation function 322. The parameters are also sent to benchmark performance database 330 for storage. Training module 335 may use the history of all the parameters, running both supervised learning and unsupervised learning, to generate a model for recognizing the traffic type of different applications. With manual training or extra source data, training module 335 can also identify the type of client device 150, which can be used to train device type recognition in the model. The device type (or device kind) may include, for example, a particular client device manufacturer and model. This model may be fetched by traffic pattern recognition function 320 and traffic evaluation function 322 for recognition and evaluation As shown in FIG. 4A, training module 335 may be a machine-learning-based function located in the cloud. In one implementation, training module 335 may receive historical training data 402 from benchmark performance database 330 or another data source. Training module 335 may run supervised learning 405 to obtain a benchmark pattern model (e.g., trained model 410) for determining applications in different client devices 150. Trained model 410 may be sent to each local device 155 acting as a distributed system 310 for the network evaluation service.

Referring to FIG. 4B, at traffic pattern recognition function 320, each segment of live traffic 412 will be input to traffic summary extraction 420 to generate a data rate, jitter, and latency value for each category of packets. The parameters output by traffic summary extraction 420 will be provided to the output trained model 410 generated by training module 335 and obtained from benchmark performance database 330. For the application patterns that can be recognized, traffic pattern recognition function 320 will forward the recognized patterns to traffic evaluation function 322 for further analysis. For application patterns that cannot be recognized, traffic pattern recognition function 320 may analyze the data via an unsupervised learning function 420. Results from unsupervised learning function 420 may be uploaded to benchmark performance database 330 for further use and/or manual assistance.

Referring to FIG. 4C, a correlation-based evaluation system 440 of traffic evaluation function 322 may compare the recognized patterns from traffic pattern recognition function 320 with a corresponding benchmark application pattern 430 from benchmark performance database 330. Based on the comparison, correlation-based evaluation system 440 may identify how much (or a level of) degradation of the application traffic pattern that is present to determine whether there is adverse application impact in the network.

Particularly, in one implementation, correlation-based evaluation system 440 may provide a network resources assessment 442, indicating whether network resources 442 are adequate for the application associated with the recognized packet pattern. Additionally, correlation-based evaluation system 440 may provide a user experience assessment 444, indicating whether the current network performance, device type, or other factors are affecting the user experience for the application. Correlation-based evaluation system 440 may calculate an application degrade level 446 which may be an indication of how far an application currently running on client device 150 is below a benchmark performance level (if at all). Application degrade level 446 may be provided to benchmark performance database 330 for training. In another implementation, application degrade level 446 may also be provided as output 450 to other functions (e.g., AI prediction function 328) or to a customer/network administrator.

Figure 5:
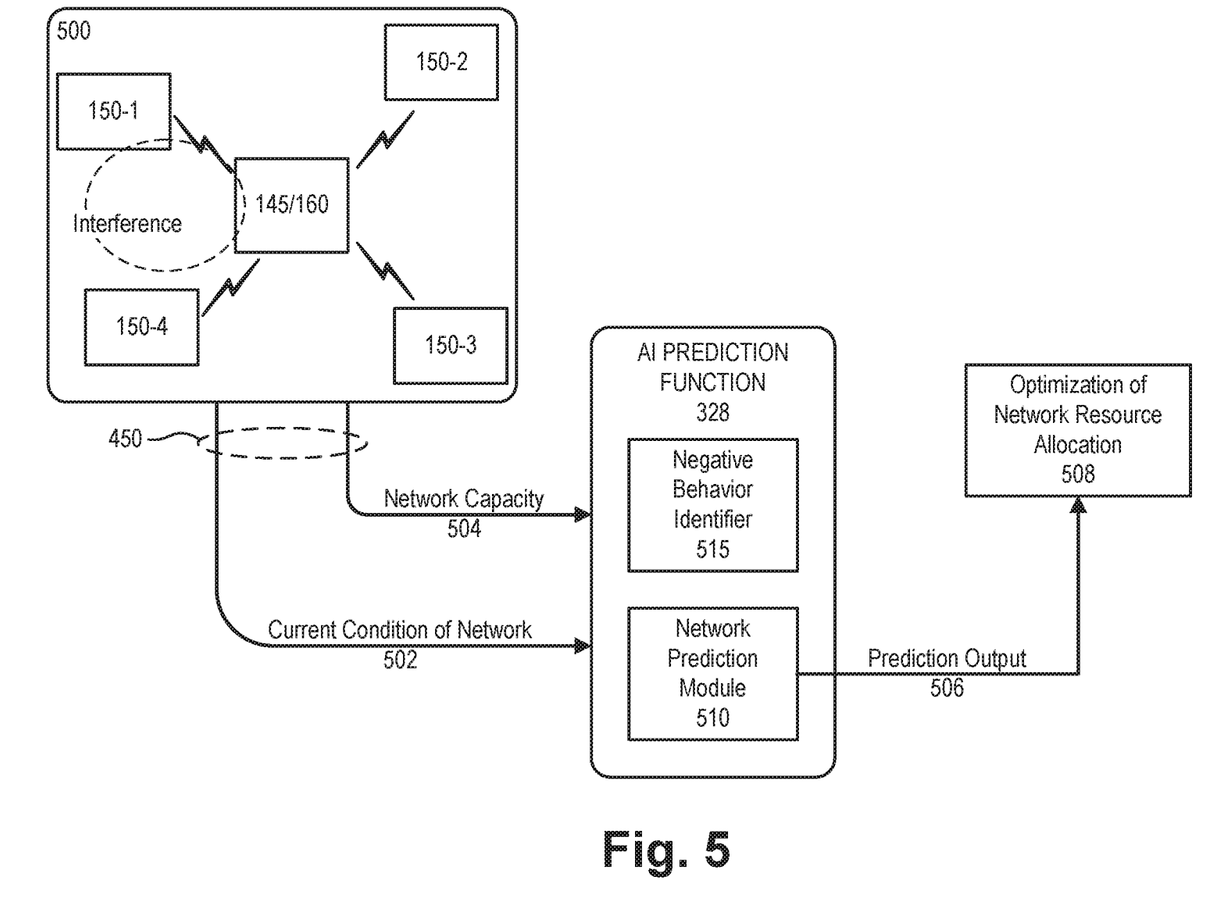
FIG. 5 is a diagram illustrating an application of the network evaluation service.

FIG. 5 is a diagram illustrating an application of the network evaluation service for evaluation of a local network 500. Network 500 may include access point 145 and client devices 150-1 through 150-4. In some instances, network 500 may also reflect a frequency occupancy condition from outside interference.

Referring to FIG. 5, as live traffic of network 500 is processed through distributed system 310, as described above in connection with FIGS. 3-4C, traffic evaluation function 322 may provide output 450 including a current condition of the network 502. The current condition of the network 502 may include, for each application in each client device 150, whether there is a degrading (e.g., data rate, latency, jitter, etc.) and the type/level of degradation, as well as how customers are impacted. Traffic evaluation function 322 may also have access to information regarding the overall capacity of the network 504. All the information (e.g., current condition 502 and network capacity 504) will be input to AI prediction function 328, which may include network prediction module 510 and a negative behavior identifier 515.

Network prediction module 510 may learn from the current conditions 502 as well as historical data from benchmark performance database 330. Network prediction module 510 may predict the performance of network 500 with the currently-connected devices 150 when capacity of network 500 changes. This prediction output 506 may be applied to optimize network resource allocation 508.

Figure 6:
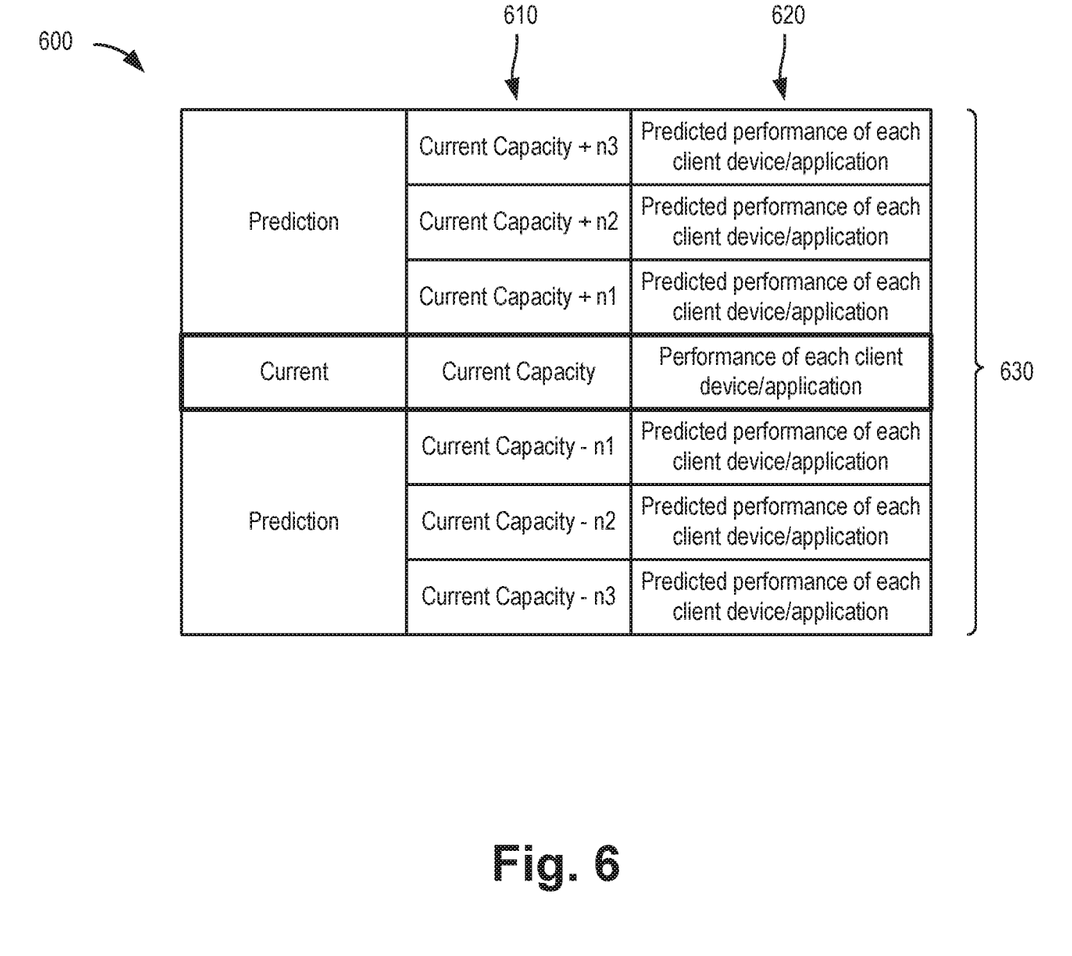
FIG. 6 is an exemplary table illustrating a prediction output of the network prediction module of FIG. 5.

FIG. 6 is an exemplary table 600 which may illustrate prediction output 506. As shown in FIG. 6, table 600 includes a capacity field 610, a performance field 620, and a variety of entries 630 for fields 610 and 620. Capacity field 610 may represent a capacity (e.g., throughput, bandwidth, etc.) of a local network relative to a current capacity. Entries 630 for capacity field 610 may indicate a current capacity value for a network or a possible upgraded or downgraded alternate capacity value (e.g., current capacity+n1, where n is a measurable network capacity value such as one gigabits-per-second (Gbps)) Performance field 620 may represent prediction of how each client device 150 and application in the network would be affected by a change in the capacity value from field 610. Entries 630 for field 620 may include one or more predicted performance parameters, such as data speed, latency, jitter, etc.

Returning to FIG. 5, AI prediction function 328 may also identify negative behavior using negative behavior identifier 515. In wireless networks, for example, airtime "fairness" is an important factor that may impact the user experiences. Some applications/client devices 150 may occupy a disproportionate amount of airtime resources. This disproportionate use of network 500 may affect normal network behavior. Thus, in parallel with providing current conditions 502 and network capacity 504 to network prediction module 510, the same data may also be provided to negative behavior identifier 515. Negative behavior identifier 515 may compare the fairness of airtime and other features to ensure there is no negative behavior of applications/client devices 150 that affect other applications/client devices 150 and degrade the overall performance of network 500.

Figure 7:
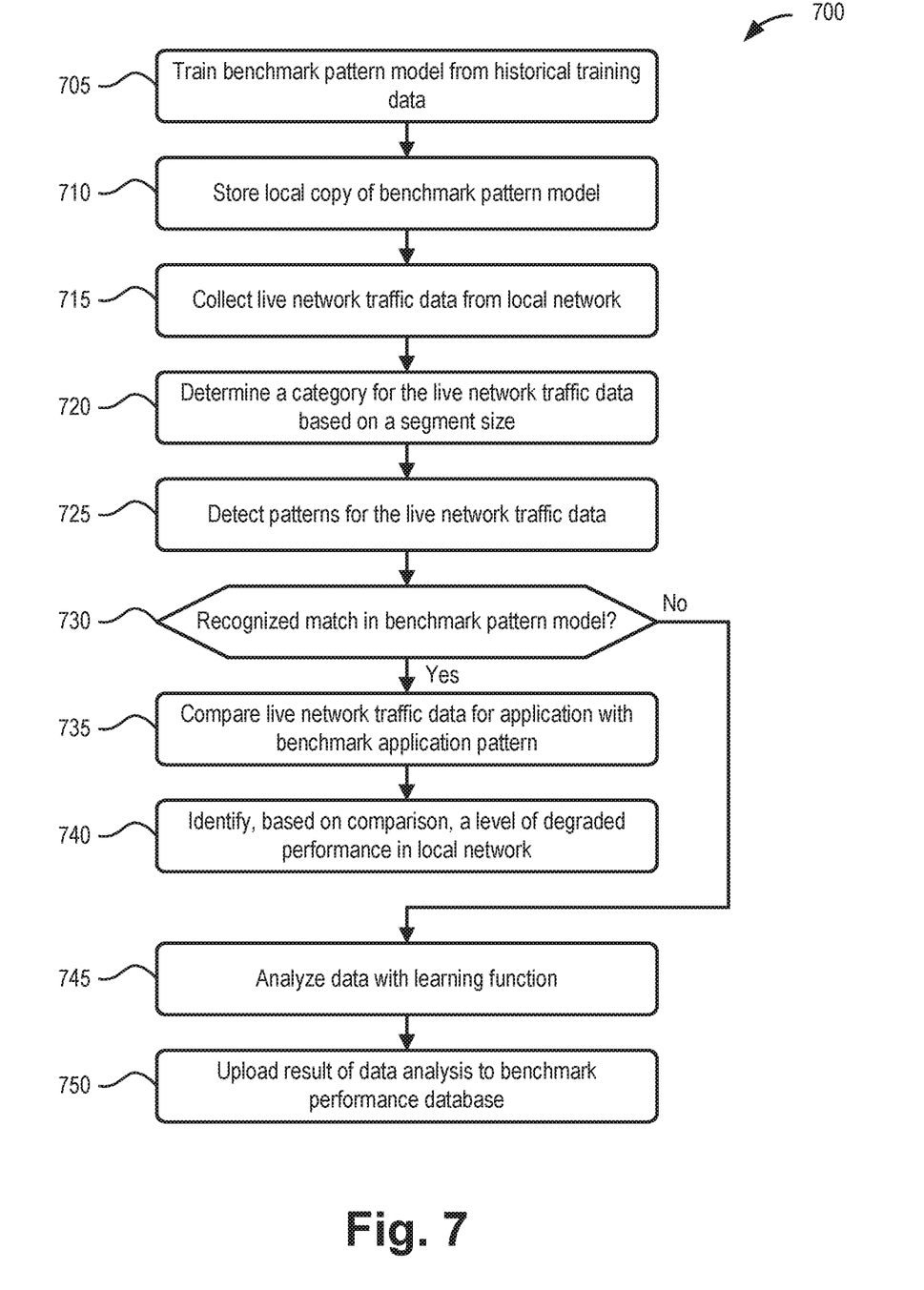
FIG. 7 is a flow diagram illustrating an exemplary process for analyzing live local network traffic, according to an implementation described herein.

FIG. 7 is a flow diagram illustrating an exemplary process 700 for analyzing live local network traffic. In one implementation, process 700 may be performed by one or more devices 155. In another implementation, process 700 may be performed by devices 155 in conjunction with distribution engine 305, benchmark performance database 330, or other devices in network environment 100.

Process 700 may include training a benchmark pattern model from historical training data (block 705), and storing a local copy of the benchmark pattern model. (block 710). For example, training module 335 may run supervised learning 405 to obtain a benchmark pattern model (e.g., trained model 410) for determining applications in different client devices 150. Trained model 410 may be stored centrally in benchmark performance database 330 and also sent to each local device 155 acting as a distributed system 310 for the network evaluation service.

Process 700 may also include collecting live network traffic data from a local network (block 715), and determining a category for the live network traffic data based on a segment size (block 720). For example, device 155 (e.g., data fetching function 312) may continuously collect live network data based on monitoring settings received from distribution engine 305. Data fetching function 312 may send one segment of data to coarse filter 314 at a time. The data may be sorted into categories, such as categories based on a data segment size.

Process 700 may further include detecting patterns for the live network traffic data (block 725), and determining if there is a match in the benchmark pattern model (block 730). For example, intelligent analysis function 318 may receive filtered data from fine filter 316 and apply pattern recognition to identify a pattern (e.g., a particular combination of data speed, latency, and/or jitter for both uplink and downlink traffic) in the filtered data that may be attributed, for example, to a particular application. In one implementation, traffic pattern recognition function 320 may use trained model 410, obtained from benchmark performance database 330, for comparison to a recognized pattern.

If there is a match in the benchmark pattern model (block 730—Yes), process 700 may include comparing the live network traffic data for the application with benchmark application pattern (block 735), and identifying, based on the comparison, a level of degraded performance in the local network (block 740). For example, traffic evaluation function 322 may compare a relevant benchmark from trained model 410 to the actual network data to determine how much the live network traffic for the application has been impacted by the network. Correlation-based evaluation system 440 may identify how much degradation of the application traffic pattern is present to determine whether there is adverse application impact in the network. Particularly, correlation-based evaluation system 440 may provide a network resources assessment 442, indicating whether network resources 442 are adequate to service the application associated with the recognized packet pattern. Additionally, correlation-based evaluation system 440 may provide a user experience assessment 444, indicating whether the current network performance, device type, or other factors are affecting the user experience for the application.

If there is not a match in the benchmark pattern model (block 730—No), process 700 may include analyzing the network data with a learning function (block 745) and uploading a result of the data analysis to the benchmark performance database (block 750). For example, when an application pattern cannot be recognized, traffic pattern recognition function 320 may analyze the data via unsupervised learning function 420. Results from unsupervised learning function 420 may be uploaded to benchmark performance database 330 for further use and/or manual assistance.

Although FIG. 7 illustrates an exemplary process for analyzing live local network traffic, according to other embodiments, process 700 may include additional operations, fewer operations, and/or different operations than those illustrated in FIG. 7, and as described herein.

Figure 8:
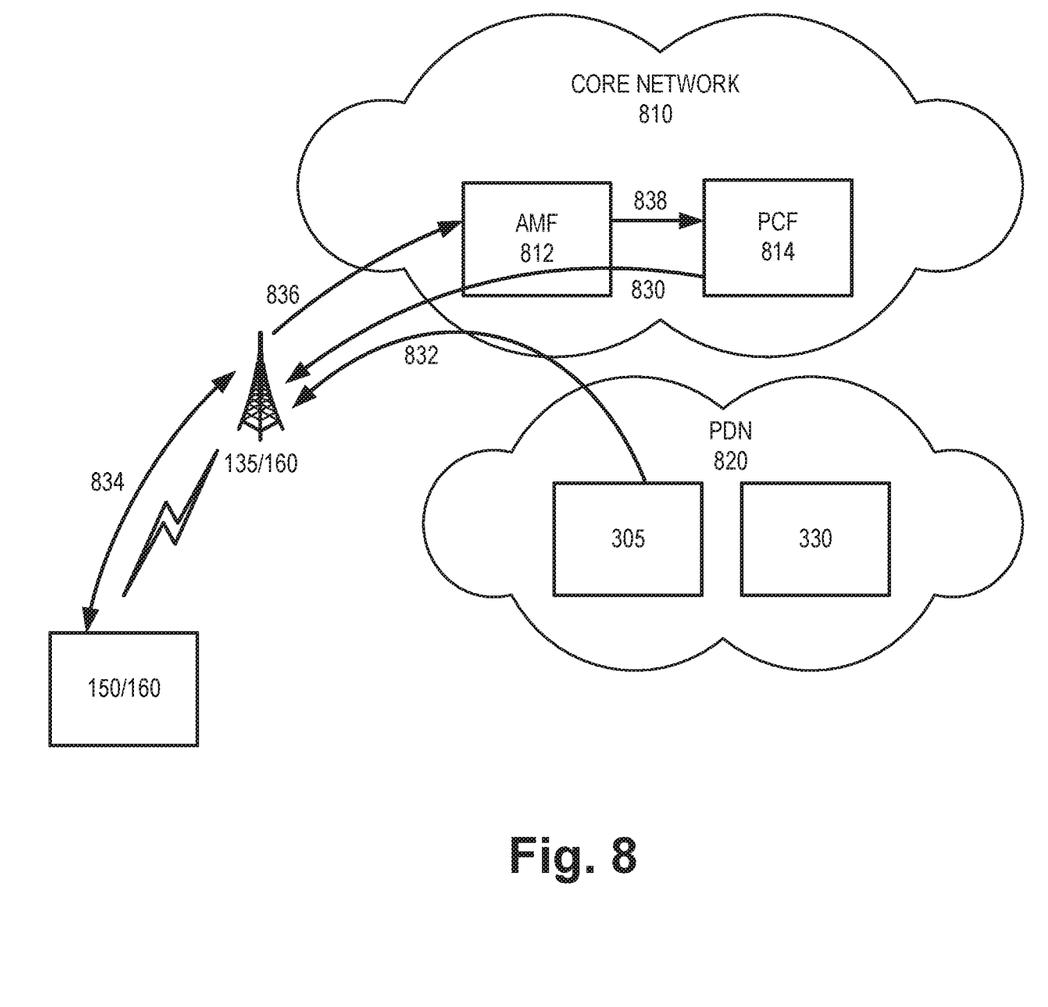
FIG. 8 is a diagram illustrating exemplary communications for applying results from the network evaluation service, according to an implementation described herein.

FIG. 8 is a diagram illustrating exemplary communications for applying results from the network evaluation service in a portion 800 of network environment 100. More specifically, FIG. 8 is a diagram illustrating exemplary admission control communications in a 5G cellular network. Network portion 800 may include wireless station 135, client device 150, and core network 810 including an Access and Mobility Management Function (AMF) 812 and a policy control function (PCF) 814, and a packet data network (PDN) 820 including distribution engine 305 and benchmark performance database 330. Communications shown in FIG. 8 provides simplified illustrations of communications in network portion 800 and are not intended to reflect every signal or communication exchanged between devices.

Core network 810 may correspond to a portion of network 110 of FIG. 1. AMF 812 may perform registration management, connection management, reachability management, mobility management, lawful intercepts, access authentication and authorization, location services management, functionality to support non-3GPP access networks, and/or other types of management processes. PCF 814 may support policies to control network behavior, provide policy rules to control plane functions (not shown), access subscription information relevant to policy decisions, perform policy decisions, and/or perform other types of processes associated with policy enforcement. PDN 820, which may also correspond to a portion of network 110, includes a network that provides data services (e.g., via packets or any other Internet protocol (IP) datagrams) to client device 150.

Using network slicing, a physical network may be sectioned (or "sliced") into multiple, virtual, end-to-end networks. Each network slice may be dedicated for different types of services with different characteristics and requirements (e.g., latency, jitter, bandwidth, etc.). A network slice refers to a complete logical network including a RAN (e.g., RAN 130 associated with wireless station 135) and core network (e.g., core network 810) that provides certain telecommunication services and network capabilities that can vary from slice to slice. Selection and configuration of network slices can, thus, have significant impact on network performance and user experience.

Referring to FIG. 8, network data 830 may be provided to wireless station 135 (e.g., from PCF 814 via AMF 812). Network data 830 may include, for example, slice identifiers, service categories, access class level, slice characteristics, slice capacity, slice status, and an AMF instance address for each network slice available via a particular wireless station 130. In some instances network data 830 may be provided to wireless station 130 on a continuously updated (e.g., dynamic) basis to reflect current network conditions.

As described above, distributed system 310 may be executed on wireless station 135 and/or client device 150 using traffic monitor 160. For example, distribution engine 305 may provide instructions 832 to wireless station 135 to distribute workloads for the network evaluation service. In the example of FIG. 8, assume client device 150 and wireless station 135 monitor uplink and downlink traffic 834 to determine a current condition of the network (e.g., corresponding to current condition 502). Based on network capacity information and other information from network data 830 (e.g., corresponding to network capacity 504), and current network condition, an AI prediction function 328 in wireless station 135, for example, may provide a prediction output 836 (e.g., corresponding to prediction output 506) to core network 810.

AMF 812 in core network 810 may receive prediction output 836 and may forward 838 the prediction output to PCF 814. In one implementation, PCF 814 may use the prediction output to proactively avoid congestion. For example, PCF 814 may adjust slice characteristics and provide updated network data 830 to wireless station 135. Additionally, or alternatively, the forwarded prediction output 838 may be provided to other network functions (not shown) in core network 810 to perform bandwidth throttling.

Although the examples of communications in FIG. 8 are described in the context of a 5G network, similar uses of the network evaluation service may be applied, for example, by different admission control functions in 4G networks.

Systems and methods described herein provide a network evaluation service that may be implemented on a live network in real time. The network evaluation service collects live network traffic data for a client device in a network; stores a benchmark pattern model; determines a category of the live network traffic data based on a segment size; detects a first traffic pattern of the live network traffic data based on measured segment parameters for the category; matches the first traffic pattern to a second traffic pattern in the benchmark pattern model to identify a result; compares the live network traffic data with a benchmark application pattern from the benchmark pattern model; and identifies, based on the comparing, a level of degraded performance in the network.

The systems and methods described herein may perform pattern recognition of network traffic of applications on client devices. A distribution engine may intelligently allocate traffic monitoring resources to adapt to network traffic levels. A distributed system may be used to reduce loads on individual devices. The network evaluation service can be used for both wired and wireless communication, including cellular, Wi-Fi, Bluetooth, and other IoT technologies. The use of live analysis may avoid the need for a large amount of hardware data storage and unrealistic analysis due to massive data size. The live analysis may also enable a real time decision making regarding the network. Each distributed system can employ a flexible pcap size to adjust between processing time and data collection time. Thus, the network evaluation service may be adapted to different high or low speed/latency networks by adjusting the collected number of packets per block. As long as processing time is less than data collection time, the network evaluation service can continue to provide analysis without missing any data.

The network evaluation service may provide a customized solution to provide network service to light usage customers and heavy usage customers. Users can choose what kinds of features are preferred or more important (e.g., throughput, latency, etc.). Additionally, network administrators may evaluate router, access point, or wireless station performance based on a dynamic set of client devices. The network evaluation service may be used to learn and evaluate a client device's performance under different internet service providers, under different environments, and under different environment/hosting device and service provider devices. In another implementation, network evaluation service may enable comparisons between a virtual client and real client devices to assess accuracy/consistency of the virtual client.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 210, etc.), or a combination of hardware and software (e.g., software 220).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 210) of a device. A non-transitory storage medium includes one or more of the storage mediums described in relation to memory 215.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
    collecting, by a computing device, live network traffic data for a client device in a network;
    storing, by the computing device, a benchmark pattern model, wherein the benchmark pattern model includes a trained model that correlates patterns of traffic transmissions with different combinations of applications and client devices executing the applications;
    determining, by the computing device, a category for the live network traffic data based on a segment size in the live network traffic data;
    detecting, by the computing device, a first traffic pattern of the live network traffic data based on measured segment parameters;
    matching, by the computing device, the first traffic pattern to a second traffic pattern for the category in the stored benchmark pattern model to identify a recognized pattern;
    comparing, by the computing device, the live network traffic data with a benchmark for the recognized pattern from the stored benchmark pattern model; and identifying, by the computing device and based on the comparing, a level of degraded performance for the application in the network, wherein the identifying indicates whether the level of degraded performance for the application is correlated to a manufacturer and a model of the client device.

2. The method of claim 1, further comprising:
determining, based on the comparing, whether allocated network resources for the network are sufficient for a particular combination of application and client device.

3. The method of claim 1, wherein the determining includes selecting a segment size category from a group of different segment size categories in the benchmark pattern model.

4. The method of claim 1, wherein the measured segment parameters include data speed, latency, and jitter.

5. The method of claim 1, wherein the matching identifies an application type generating the live network traffic data for the client device.

6. The method of claim 1, wherein determining the category for the live network traffic data includes:
determining the category based on a packet size or a frame size in the network traffic data.

7. The method of claim 1, wherein the network includes one of a radio access network (RAN), a local area network (LAN), or a wireless LAN.

8. The method of claim 1, further comprising:
filtering, the live network traffic data, wherein a processing time for filtering a segment of the live network traffic data is less than a processing time for collecting the live network traffic data from the segment.

9. The method of claim 1, further comprising:
uploading the first traffic pattern to a database accessible to other computing devices in a distributed system.

10. A computing device comprising:
a communication interface;
a memory, wherein the memory stores instructions; and
a processor, wherein the processor executes the instructions to:
collect live network traffic data for a client device in a network;
store a benchmark pattern model, wherein the benchmark pattern model includes a trained model that correlates patterns of traffic transmissions with different combinations of applications and client devices executing the applications;
determine a category of the live network traffic data based on a segment size in the live network traffic data;
detect a first traffic pattern of the live network traffic data based on measured segment parameters for the category;
match the first traffic pattern to a second traffic pattern for the category in the stored benchmark pattern model to identify a recognized pattern;
compare the live network traffic data with a benchmark application pattern from the stored benchmark pattern model; and
identify, based on the comparing, whether performance for the application is degraded in the network, wherein the identifying indicates whether the level of degraded performance for the application is correlated to a manufacturer and a model of the client device.

11. The computing device of claim 10, wherein the processor further executes the instructions to:
determine, based on the identifying, whether allocated network resources for the network are sufficient for a combination of the application and the client device.

12. The computing device of claim 10, wherein the processor further executes the instructions to:
determine, based on the identifying, whether current performance of the network is negatively affecting a user experience associated with the application.

13. The computing device of claim 10, wherein, when collecting, the processor further executes the instructions to:
collect the live network traffic data based on monitoring settings received from a distribution engine for multiple computing devices.

14. The computing device of claim 10, wherein the measured segment parameters include data speed, latency, or jitter for uplink and downlink traffic.

15. The computing device of claim 10, wherein the trained model associates application types with different kinds of client devices based on traffic patterns for the different segment size categories.

16. The computing device of claim 10, wherein the processor further executes the instructions to:
upload an unrecognized third traffic pattern of the live network traffic data to a database accessible to other computing devices in a distributed system.

17. A non-transitory storage medium that stores instructions executable by a processor of a computational device to:
collect live network traffic data for a client device in a network;
store a benchmark pattern model, wherein the benchmark pattern model includes a trained model that correlates patterns of traffic transmissions with different combinations of applications and client devices executing the applications;
determine a category of the live network traffic data based on a segment size in the live network traffic data;
detect a first traffic pattern of the live network traffic data based on measured segment parameters for the category;
match the first traffic pattern to a second traffic pattern for the category in the stored benchmark pattern model to identify a recognized pattern;
compare the live network traffic data with a benchmark application pattern from the stored benchmark pattern model; and
identify, based on the comparing, a level of degraded performance for the application in the network, wherein the identifying indicates whether the level of degraded performance for the application is correlated to a manufacturer and a model of the client device.

18. The non-transitory storage medium of claim 17, further storing instructions executable by the processor of the computational device to:
filter the measured segment parameters to include one or more of data speed, latency, or jitter.

19. The non-transitory storage medium of claim 17, further storing instructions executable by the processor of the computational device to:
identify, based on the matching, an application type that generates the live network traffic data for the client device.

20. The non-transitory storage medium of claim 17, wherein the network includes one of a radio access network (RAN), a local area network (LAN), or a wireless LAN.

* * * * *